United States Patent [19]

Pontius et al.

[11] Patent Number: 4,899,912
[45] Date of Patent: Feb. 13, 1990

[54] DEVICE FOR PREPARING AND EJECTING A CHEMICALLY REACTING MIXTURE

[75] Inventors: Klaus Pontius, Hermeskeil; Manfred Settinger, Ockten, both of Fed. Rep. of Germany

[73] Assignee: Klockner Ferromatik Desma GmbH, Malterdingen, Fed. Rep. of Germany

[21] Appl. No.: 87,821

[22] Filed: Aug. 21, 1987

[30] Foreign Application Priority Data

Aug. 27, 1986 [DE] Fed. Rep. of Germany ....... 3629021

[51] Int. Cl.$^4$ .............................................. B67D 1/08
[52] U.S. Cl. ................................... 222/145; 222/149; 222/342; 239/114; 239/116
[58] Field of Search ........ 222/137, 135, 145, 148–149, 222/342, 389; 239/112–118; 137/240, 242, 244

[56] References Cited

U.S. PATENT DOCUMENTS 4,239,732 12/1980 Schneider ........................... 422/133
4,408,627 10/1983 Harris ................................. 137/242
4,523,696 6/1985 Commette et al. ................. 222/135

FOREIGN PATENT DOCUMENTS 495973 9/1950 Belgium ............................. 137/242
2065841 11/1977 Fed. Rep. of Germany .

Primary Examiner—Michael S. Huppert
Attorney, Agent, or Firm—Watson, Cole, Grindle & Watson

[57] ABSTRACT

A device for preparing a chemically reacting mixture and for ejecting the mixture into a mold, the mixture comprising at least two components, in particular a mixture of isocyanate and a polyol that reacts completely to form polyurethane, the device having a mixing head with an outwardly opening bore, and a reciprocable ram coupled to the head. The ram has an ejector rod axially movable in the bore for therewith defining a mixing chamber and for ejecting the mixture from the chamber. The head has inlet passages for inletting the components into the chamber for preparing the mixture. The mixture head has another bore extending perpendicular to the bore in which the rod slides, and a ceramic body is located in the other bore for stripping off a film of the mixture from the rod during its axial return movement.

5 Claims, 2 Drawing Sheets

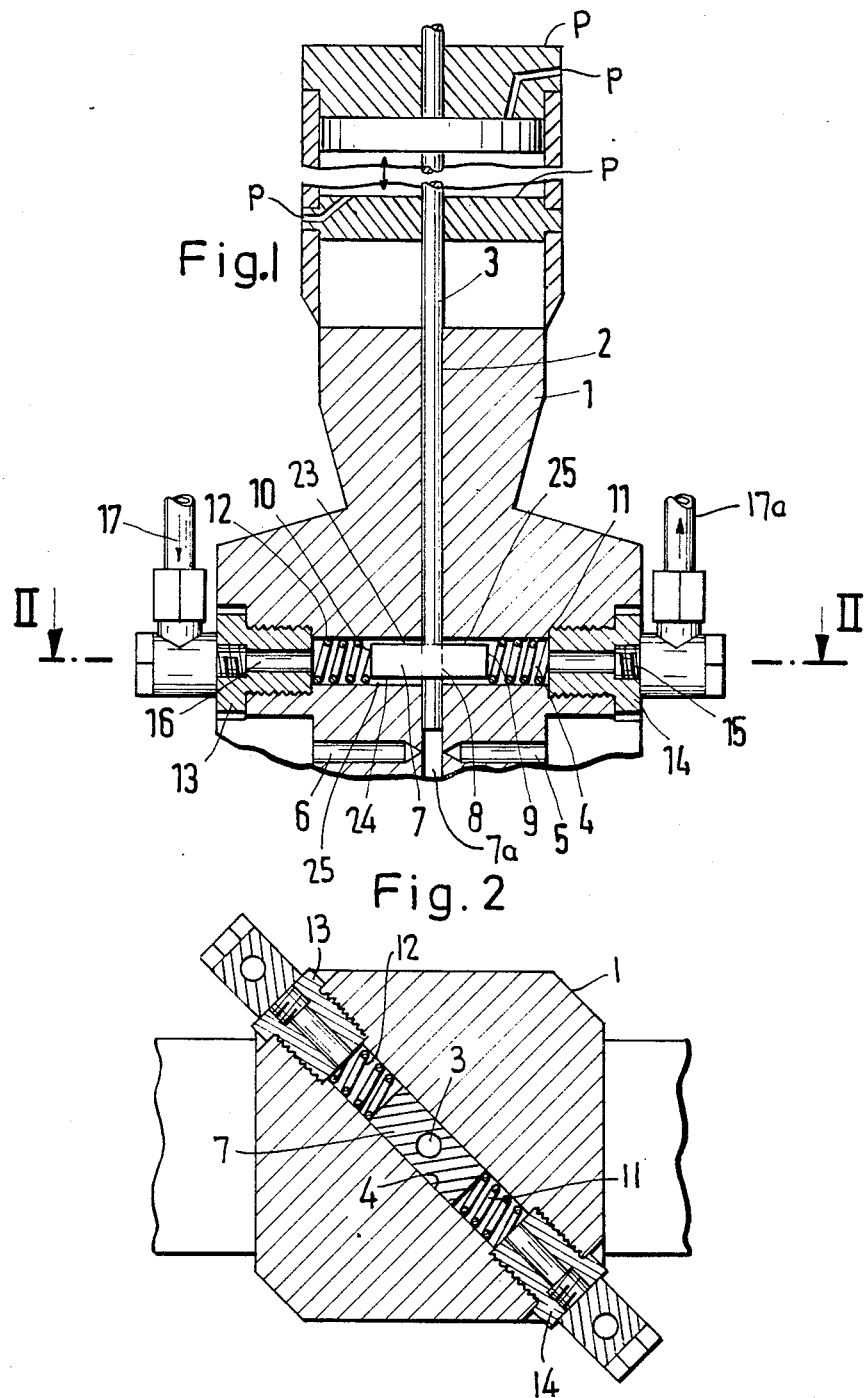

DEVICE FOR PREPARING AND EJECTING A CHEMICALLY REACTING MIXTURE

RELATED APPLICATION

This application relates to U.S. Ser. No. 087,786, filed Aug. 21, 1987, commonly owned herewith.

BACKGROUND OF THE INVENTION

This invention relates to a device for preparing a chemically reacting mixture and for ejecting the mixture into a mold cavity, the mixture comprising at least two components, in particular a mixture of isocyanate and a polyol that reacts completely to form polyurethane. The device comprises a mixing head having an outwardly open bore, and a reciprocable ram coupled to the head, the ram having an ejector rod axially movable in the bore for therewith defining a mixing chamber and for ejecting the mixture from the chamber.

West German Patent No. 2065841 discloses a device of this general type for preparing molded bodies of polyurethane. The mixing head of this device has a bore with an open face which forms the exit opening for the mixture, and to which the cavity of a mold is connected to prepare a molded body of polyurethane. Opposed infeed nozzles are located between opposite ends of the bore in the mixing head for respectively injecting isocyanate and a polyol into the bore. Mixing results from the impact of one chemical on the other. The bore defines a mixing chamber together with an axially movable rod of the reciprocable ram. The rod moves axially in the bore for ejecting the mixture from the chamber. The ram is known as a cleaning ram, and while the components are being mixed in the chamber, the ejector rod of the ram is located above the opposing inlet nozzles.

The completely reacting polyurethane has a very high adhesion strength so that the film of polyurethane which forms on the rod frequently results in the need for extremely high hydraulic pressures to move the rod axially. Therefore, the cleaning rod is an extremely stressed part, which frequently breaks.

SUMMARY OF THE INVENTION

An object of the invention ss to provide a device of the type generally characterized above which avoids the formation of adhesive forces acting on the rod of the cleaning ram during operation of the device.

In carrying out this objective, the device according to the invention has its mixing head provided with another through bore, the axis of which intersects with the axis of the bore in which the ejector rod slides, and a ceramic body is located in this other bore. The ceramic body has an opening through which the rod extends in its retracted and extended positions, such that any film or residue of the mixture adhering to the rod is stripped from the rod by the ceramic body as the rod is retracted from its extended position after ejecting the mixture from the mixing head.

A portion of the ceramic body may be spaced from the wall of the second bore so as to define a gap through which a liquid rinsing agent is fed for rinsing away any film or residue stripped from the rod. The second bore may have a circular cross-section, and the ceramic body may have a flat surface thereby defining the gap with the wall of the other bore.

The ceramic body may be in the form of a pair of ceramic stripper elements having abutting end walls each shaped to together form the opening therethrough.

Spring biasing means may be mounted within the other bore so as to abut against opposite ends of the stripper elements for abutting the end walls thereof together. Or, pneumatically or hydraulically operated means may be mounted within the other bore for operating against the opposite ends of the stripper elements for abutting the end walls thereof together. Such pressurized means may be regulated to tighten the abutting end walls of the stripper elements together during the retracted movements of the ejector rod to assure stripping of the polyurethane film therefrom.

Other objects, advantages and other features of the invention will become more apparent from the following detailed description of the invention when taken in conjunction with the accompanying drawings.

BRIEF DESCRIPTIONS OF THE DRAWINGS

FIG. 1a is a schematic illustration of one embodiment of the invention showing the device in vertical cross-section;

FIG. 2 is a cross-sectional view taken substantially along the line 2—2 of FIG. 1;

DETAILED DESCRIPTION OF THE INVENTION

Figure 3:
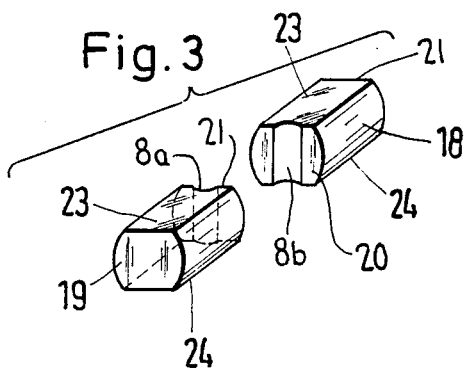
FIG. 3 is an expanded, perspective view of a pair of ceramic stripper elements for use in carrying out the invention.

Turning now to the drawings wherein like reference characters refer to like and corresponding parts throughout the several views, one embodiment of the device according to the invention is shown in FIG. 1 as comprising a mixing head 1 having an axial bore 2 opening outwardly of the head, the bore defining a mixing chamber 2a together with a rod 3 mounted for axial sliding movement within the bore. Opposing inlet passages or nozzles 4 and 5 are located in the mixing head for respectively inletting quantities of isocyanate and a polyol into the mixing chamber for preparing the chemically reacting mixture therein as these two components impact on one another, to form a polyurethane as known in the art.

A reciprocable ram is coupled to the mixing head in any known manner, the ram including an ejector or cleaning rod 3 axially movable in bore 2. Similarly as in the aforementioned related application, a cylinder of the ram houses a ram piston which reciprocates therein, in the direction of the double arrow, between opposing cylinder plates P. The ram piston is reciprocated in the normal manner by inletting and expelling pressurized hydraulic fluid or pressurized air, from a suitable source (not shown), to opposite sides of the piston through hydraulic or pneumatic flow passages p located in plates P.

In accordance with the invention, the mixing head has another outwardly open bore 4 therein, the axis of bore 4 intersecting the axis of bore 2 at right angles. A ceramic body 7 is mounted within bore 4 and has a through opening 8 of substantially the same shape and size as that of rod 3. Bore 4 and the ceramic body therein are so positioned relative to passages 5,6 that the rod extends through opening 8 in the FIG. 1 retracted position of the rod.

Abutting the opposing end faces 9, 10 of the ceramic body are coil springs 11, 12 which may be mounted in bore 4. Screw caps 13 and 14 extend into opposite ends of bore 4 and are threadedly mounted in place for adjusting the position of the ceramic body to assure that its opening 8 is coaxial with the axis of rod 3. Moreover, the end caps have through bores 15 and 16, and inlet and outlet pipes 17 and 17a are respectively connected thereto. A liquid rinsing agent of some suitable type may therefore be fed through pipe 17 and outwardly through pipe 17a for carrying away any film or residue stripped from rod 3 which will be described in more detail hereinafter.

The ceramic body 7 may comprise a single element as shown in FIGS. 1 and 2, or may comprise a pair of ceramic stripper elements 18 and 19 shown in FIG. 3. Confronting end walls 20 and 21 of the strippers are curved centrally as at 8a and 8b so that when end walls 20 and 21 abut against one another when assembled within bore 4, stripper elements 8a, 8b together form through opening 8. Also, the ceramic body (7, or stripper elements 18 and 19) has a flat surface 23 and/or 24 so as to define a gap 25 with the wall of bore 4 which may be of circular cross-section. This gap thus provides a passage through which the rinsing agent may flow carrying away any film or residue stripped from the rod.

Figure 4:
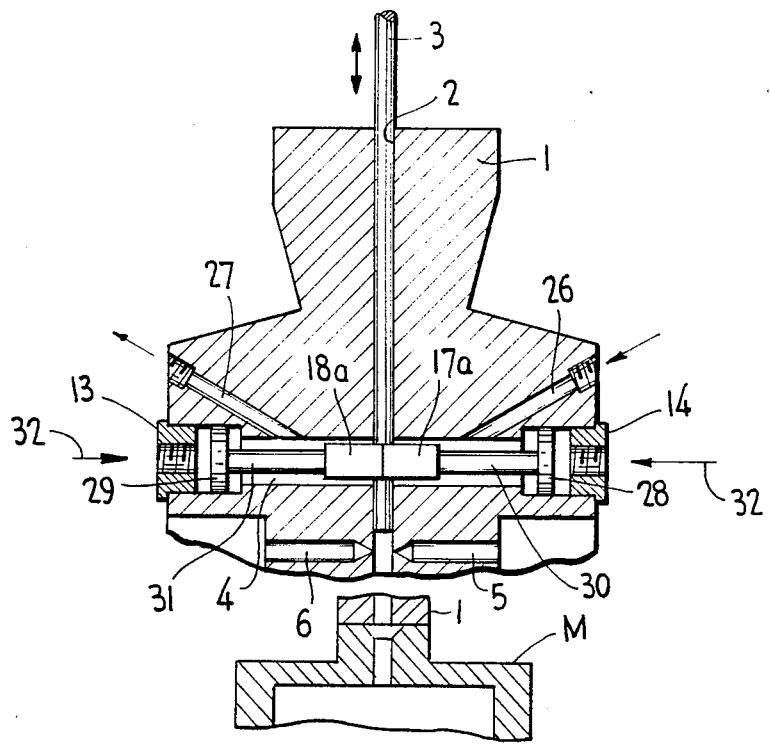
FIG. 4 is a view similar to FIG. 1 of another embodiment of the invention shown together with the partial showing of a mold.

The device of the FIG. 4 embodiment is essentially the same as FIG. 1 except that the mixing head is provided with passages 26 and 27 through which the liquid rinsing agent may flow. And, ceramic stripper elements 23a, essentially the same as elements 23 of FIG. 3, are centered in bore 4, pneumatically or hydraulically, for assuring the concentricity between opening 8 and rod 3. Bore 4 is countersunk at opposite ends as shown, and pistons 28, 29 operate therein. Rods 30 and 31 on these pistons are respectively connected to stripper elements 23a. And, hollow end caps 13 and 14 cover the pistons in spaced relation. Thus, pressurized air or pressurized hydraulic fluid may be introduced in the direction of arrows 32 against the outer sides of the pistons for centering the stripper elements and for increasing the pressure at the abutting ends of the strippers to assure removal of the polyurethane film from the rod when retracted after it has ejected the mixture from the mixing head.

During the mixing of isocyanate and polyol, the ram with its rod 3 is in its retracted position of FIG. 1. As soon as the mixing is completed, the ram is actuated for moving the rod axially to convey the mixture (which completely reacts to form polyurethane) out of the mixing chamber. The mixture is conveyed from bore 4 into the cavity of a mold M, as generally shown in FIG. 4, in which a molded body of polyurethane is formed. During this extended movement of rod 3, a film of the completely reacted mixture forms on the cleaning rod. When the rod is again retracted to its FIG. 1 position, such film is stripped from the rod by the ceramic body as the rod slides through opening 8 thereof. The liquid rinsing agent flowing through bore 4 via gap orggaps 25 carries away the residue of the film that is stripped from the cleaning rod and exits through pipe 17a or passage 27.

An annular coating of the film remains on the rod below the ceramic body when the rod is fully retracted, and thereby forms a seal for mixing chamber 2a.

The stripping of the polyurethane film from rod 3 is assured by maintaining a close tolerance between the size of through opening 8 and the diameter of rod 3. And, this tolerance may be adjusted manually by caps 13, 14 which bear against springs 10 and 11, or may be adjusted pneumatically or hydraulically as in FIG. 4.

Since the polyurethane film which contacts the ceramic body during stripping does not permanently adhere to the ceramic body, the stripped film can be easily carried away by the rinsing agent, and there is no permanent adhesion between the ceramic body and rod 3. The ceramic body may be of any suitable ceramic material such as titanium oxide.

What is claimed is:

1. A device for preparing a chemically reacting mixture, and for ejecting the mixture into a mold, the mixture comprising at least two components, in particular a mixture of isocyanate and a polyol that reacts completely to form polyurethane, the device comprising a mixing head having an outwardly open first bore, a reciprocable ram coupled to said head, said ram having an ejector rod axially movable in said bore for ejecting the mixture from said chamber when in an extended position, said rod defining with said bore a mixing chamber in a retracted position of said rod, said head having inlet passages for inletting the respective components into said chamber for preparing the mixture, means associated with said ram for axially moving said rod between said positions for ejecting the mixture out of said chamber, said mixing head having an outwardly open second bore intersecting with said first bore, ceramic body means located in said second bore and comprising a pair of stripper elements having abutting end walls shaped to together form an opening of substantially the same shape and size as that of said rod, said second bore being so positioned relative to said passages that said rod extends through said opening in said retracted position of said rod, whereby any film or residue of the mixture adhering to said rod is stripped from said rod by said ceramic body means as said rod is retracted from said extended position.

2. The device according to claim 1, wherein a portion of said ceramic body means is spaced from the wall of said second bore so as to define a gap therewith, and means communicating with said second bore for feeding a liquid rinsing agent through said gap for carrying away any film or residue stripped from said rod.

3. The device according to claim 2, wherein said second bore is of circular cross-section, and said ceramic body means has a flat surface defining said gap with said wall of said second bore.

4. The device according to claim 1, wherein spring biasing means are mounted within said second bore and bear against opposite ends of said stripper elements for abutting said end walls together.

5. The device according to claim 1, wherein pressurizable means are mounted within said second bore and operate against opposite ends of said stripper elements for abutting said end walls together.

* * * * *